United States Patent [19]

Jopson

[11] Patent Number: 5,386,314

[45] Date of Patent: Jan. 31, 1995

[54] POLARIZATION-INSENSITIVE OPTICAL FOUR-PHOTON MIXER WITH ORTHOGONALLY-POLARIZED PUMP SIGNALS

[75] Inventor: Robert M. Jopson, Rumson, N.J.

[73] Assignee: AT&T Corp., Murray Hill, N.J.

[21] Appl. No.: 120,118

[22] Filed: Sep. 10, 1993

[51] Int. Cl.⁶ .............................................. G02F 1/39
[52] U.S. Cl. .................................. 359/326; 359/332; 385/122
[58] Field of Search .............................. 359/326–332; 385/11, 14, 24, 43, 122; 372/20–22

[56] References Cited

U.S. PATENT DOCUMENTS

| | | | |
|---|---|---|---|
| 4,095,122 | 6/1978 | Damen et al. | 359/326 |
| 4,128,772 | 12/1978 | Chang et al. | 359/326 X |
| 4,316,147 | 2/1982 | Khan et al. | 324/300 |
| 4,784,450 | 11/1988 | Jain et al. | 359/332 |
| 4,867,518 | 9/1989 | Stamnitz et al. | 385/43 X |
| 4,906,949 | 3/1990 | Pocholle et al. | 372/20 X |
| 4,966,431 | 10/1990 | Heismann | 385/11 |
| 5,212,743 | 5/1993 | Heismann | 385/11 |

FOREIGN PATENT DOCUMENTS

| | | |
|---|---|---|
| 61-18935 | 1/1986 | Japan . |
| 61-248581 | 11/1986 | Japan . |
| 2-31489 | 2/1990 | Japan . |

OTHER PUBLICATIONS

Gnauck, A. H., Jopson, R. M. and Derosier, R. M., "10–Gb/s 360–km Transmission Over Dispersive Fiber Using Midsystem Spectral Inversion," IEEE Photonics Technology Letters, vol. 5, No. 6, Jun. 1993, pp. 663–666.

Hasegawa, Takasi, Inoue, Kyo, Oda, Kazuhiro and Hiromu, Toba, "Multi–Channel Frequency Conversion Over 1 THz Using Fiber Four–Wave Mixing," Post Deadline Digest of the Optical Amplifiers and their Applications Conference, Paper PD7, Jul. 4–6, 1993, Yokohama, Japan.

Inoue, Kyo, "Four–Wave Mixing in an Optical Fiber in the Zero–Dispersion Wavelength Region," Journal of Lightwave Technology, vol. 10, No. 11, Nov. 1992, pp. 1553–1561.

Inoue, Kyo, "Polarization Effect on Four–Wave Mixing Efficiency in a Single–Mode Fiber," IEEE Journal of Quantum Electronics, vol. 28, No. 4, Apr. 1992, pp. 883–894.

Jopson, R. M., Gnauck, A. H., and Derosier, R. M., "Dispersion By Spectral Inversion," Electronics Letters, vol. 29, No. 7, Apr. 1, 1993, pp. 576–577.

Yariv, Amnon, Fekete, Dan and Pepper, David M., "Compensation for Channel Dispersion by Nonlinear Optical Phase Conjugation," Optics Letters, vol. 4, Jan. 1979, pp. 52–54.

Primary Examiner—John D. Lee

[57] ABSTRACT

The present invention provides an apparatus and method for performing polarization-insensitive four-photon mixing of optical signals. The polarization-insensitive optical mixer receives an input optical signal and two substantially orthogonally polarized pump signals. The input optical signal and the two substantially orthogonally polarized pump signals are combined in a beam combiner and then four-photon mixed in a first nonlinear mixing device to produce a number of mixing products. The two substantially orthogonally polarized pump signals may be generated in an orthogonal pump signal generator which includes a second nonlinear mixing device for four-photon mixing the first pump signal and a mixing signal to produce a second pump signal which is a phase conjugate of the first pump signal. Certain of the mixing products represent phase conjugates of the input optical signal, and are therefore useful in compensating for chromatic distortion in optical fiber.

25 Claims, 8 Drawing Sheets (PRIOR ART)

POLARIZATION-INSENSITIVE OPTICAL FOUR-PHOTON MIXER WITH ORTHOGONALLY-POLARIZED PUMP SIGNALS

BACKGROUND OF THE INVENTION

1. Field of the Invention

The present invention relates generally to improvements in optical communication systems. More particularly, the present invention relates to four-photon mixing techniques for frequency converting and/or phase conjugating optical signals.

2. Description of Prior Art

In optical communication systems, it is often desirable to four-photon mix an optical signal. For example, one important aspect of four-photon mixing is that it can produce the phase conjugate of an optical signal. Phase conjugating an optical signal at the midpoint of an optical fiber span can compensate for fiber chromatic dispersion and thus allow the span to support higher bit rate-distance products. Chromatic dispersion refers to a phenomenon in which the speed of an optical signal through the fiber varies as a function of the optical signal frequency or wavelength. Because the phase conjugate of a given signal exhibits a reversal of phase as a function of time, mid-span conjugation allows the effects of dispersion in the first half of a fiber span to be canceled as the phase conjugated signal propagates along the second half. See A. Yariv, D. Fekete and D. Pepper, "Compensation for channel dispersion by nonlinear optical phase conjugation", Optics Letters, vol 4, pp 52–54, 1979. Midsystem optical phase conjugation has extended the bit rate-distance product achievable over the normal dispersion fiber which makes up much of the world's existing fiber communication channels. See A. Gnauck, R. Jopson and R. Derosier, "10 Gb/s 360 km Transmission over Dispersive Fiber Using Midsystem Spectral Inversion", IEEE Photonics Technology Letters, vol 5, no 6, June 1993. Frequency conversion is used in many other applications, including compensation for stimulated Raman scattering in multichannel systems by global inversion of the channel signal frequencies, routing in wavelength division multiplexed (WDM) networks and switching in wavelength-division switches.

Frequency conversion of optical signals is typically performed using four-photon mixing, also commonly referred to as four-wave mixing. Four-photon mixing is a nonlinear process which produces various mixing products by mixing an input optical communication signal with either one or two higher power optical signals, or pumps, in a nonlinear mixing medium such as a semiconductor laser, a semiconductor laser amplifier or a length of dispersion-shifted fiber. However, the efficiency of the four-photon mixing process is highly dependent upon the relative polarizations of the input optical signal and the pump. Since the input signal polarization typically varies randomly with time, to maintain optimal efficiency in a four-photon mixing process one usually must control or adjust for the variation. Available techniques for controlling relative signal and pump polarization typically utilize polarization controllers or other manual or automated polarization adjustment hardware. Other disadvantages of existing polarization control include signal attenuation and limited optical bandwidth in some techniques.

Failure to maintain proper polarization alignment between the signal and the pump may result in a substantial decrease in the power of the output mixing products. In fact, for some polarization combinations, the power in the mixing products can be effectively zero. When four-photon mixing is used to phase conjugate an input signal, the advantages of optical phase conjugation would often be more than offset by a reduction in conjugated signal power. Since detecting and adjusting relative signal polarizations requires additional components, equipment and expense, polarization sensitivity presently limits the usefulness of frequency conversion and phase conjugation in commercial applications.

A recently developed experimental technique attempts to alleviate polarization sensitivity in four-photon mixing by using a polarization beam splitter and a fiber loop to produce and mix separately polarized versions of both the incoming optical signal and the pump. See T. Hasegawa et al., "Multi-Channel Frequency Conversion Over 1 THz Using Fiber Four-Wave Mixing", Post Deadline Digest of the Optical Amplifiers and their Applications Conference, paper PD-7, Jul. 4–6, 1993, Yokohama, Japan. Although the Hasegawa fiber loop four-photon mixing technique apparently reduces the sensitivity of the mixing process efficiency to incoming signal polarization, it suffers from a number of significant drawbacks. For example, a polarization controller is required in the fiber loop in order to effectuate the proper recombination of the different polarizations of the mixing products. This leads to additional hardware costs both for the polarization controller itself as well as for any additional devices required to appropriately adjust the polarization controller. Furthermore, the fiber loop uses relatively long lengths of dispersion-shifted or non-dispersive fiber to serve as a nonlinear medium for four-photon mixing. As such, the fiber loop technique may not be readily applicable to other commonly used nonlinear four-photon mixing media, such as semiconductor laser amplifiers. Since the technique depends on the polarization-independent nonlinear properties of optical fiber and since it requires that the signal loop back to the polarization splitter, it would be difficult to implement in a commercially advantageous form such as a photonic integrated circuit. Another disadvantage of this technique is signal attenuation in the polarization splitter.

In many currently available optical mixing processes, the pump signal power is limited by an effect known as stimulated Brillouin scattering (SBS). SBS distortion usually becomes a significant factor in fibers for pump powers in the range of 3.0 to 10.0 dBm, where Dbm refers to decibels relative to one milliwatt. As is well known, the SBS threshold is raised when the linewidth of the pump signal is wider than the SBS bandwidth, which is approximately 20 Mhz. The linewidth of the pump signal may be artificially widened beyond the SBS bandwidth by phase modulating the pump signal. However, using phase modulation to raise the SBS threshold also broadens the linewidths of the resulting mixing products, which, after the mixing product passes through chromatic dispersion, may result in phase distortion at the signal receiver and degradation in system performance. Current techniques typically cannot provide both an increase in the SBS threshold using phase modulation, and a narrow linewidth output mixing product.

As is apparent from the above, a need exists for a polarization-insensitive optical mixer which produces relatively constant frequency converted and/or phase conjugated signal output power regardless of input signal polarization. Maximum benefit will thereby be obtained in systems compensating dispersion by optical phase conjugation, as well as in other frequency conversion applications. The optical four-photon mixer should be useful with any type of nonlinear mixing device, and therefore suitable for implementation in the form of a photonic integrated circuit. Furthermore, the optical mixer should be capable of using low frequency phase modulation to raise pump signal SBS thresholds without causing phase distortion in the output mixing products.

SUMMARY OF THE INVENTION

The present invention provides a polarization-insensitive optical mixer particularly well-suited for use in optical phase conjugation. The polarization-insensitive optical mixer of the present invention includes a signal input for receiving an input optical signal; a pump signal input for receiving two substantially orthogonally polarized pump signals; a beam combiner for combining the optical signal and the two substantially orthogonally polarized pump signals; and a nonlinear mixing device for four-photon mixing the combined input optical signal and the two substantially orthogonally polarized pump signals to produce a number of mixing products. One or more of the mixing products produced are phase conjugates of the input optical signal, suitable for use in optical fiber dispersion compensation techniques. Also, one or more of the mixing products produced are frequency-shifted copies of the input signal suitable for use in frequency conversion applications.

In accordance with one aspect of the present invention, the two substantially orthogonally polarized pump signals are generated in an orthogonal pump signal generator. The orthogonal pump signal generator includes a first signal source for supplying the first pump signal; a second signal source for supplying a mixing signal; a beam combiner for combining the first pump signal and the mixing signal; and a second nonlinear mixing device for four-photon mixing the first pump signal and the mixing signal to produce a second pump signal which is a phase conjugate of the first pump signal. A second optical mixing process can thus be used to produce two phase conjugate pump signals which, if necessary, may be shifted in polarization to form two orthogonal pump signals for polarization-insensitive optical mixing. Because the polarizations of the pump and mixing signals used in the orthogonal pump signal generator of the present invention are not time varying, the optical mixing process used therein need not be polarization-insensitive. The optical mixer of the present invention may also use orthogonally polarized pump signals generated using other pump signal generators.

In accordance with another aspect of the present invention, the orthogonal pump signal generator may contain a differential polarization rotator after the second nonlinear mixing device. This would allow the use of polarization-aligned four-photon mixing to produce the second pump signal with a polarization aligned with that of the first pump signal. The differential polarization rotator would change the relative polarizations between the two pump beams so that they would become orthogonal to each other.

In accordance with another aspect of the present invention, the two orthogonally polarized pump signal sources may include phase modulation in order to raise the power threshold at which distortion resulting from stimulated Brillouin scattering (SBS) begins. The phase modulation on one of the orthogonal pump signals is substantially opposite in sign to the modulation on the other pump signal, such that phase distortion in the phase conjugate output mixing products resulting from phase modulation of the orthogonal pumps is eliminated.

In accordance with yet another aspect of the present invention, polarization control may be provided for the orthogonal pump signals in order to minimize the sensitivity of the mixing process to input signal polarization. The automatic polarization control may use a particular mixing product, such as a two-tone product of the two pump signals, in order to minimize the sensitivity to input signal polarization. By minimizing the power in a two-tone product through feedback control, maximal independence from input signal polarization can be maintained.

In accordance with a further aspect of the present invention, various design rules for relative pump and signal frequency placements are provided. One placement which minimizes potential interference from undesired mixing products according to the design rules is achieved by placing the input optical signal to be mixed closer to the dispersion zero than the pump signals.

As a feature of the present invention, the polarization-insensitive four-photon mixer produces maximum and substantially constant mixing product output power regardless of input signal polarization. The present invention therefore ensures that maximum bit rate distance product improvement can be obtained using, for example, phase conjugation dispersion compensation techniques.

As another feature of the present invention, the resulting polarization insensitivity is not dependent upon a particular type of mixing device. Any suitable optical mixing device or medium may be used. For example, although dispersion-shifted fiber may be used as a mixing medium in accordance with the present invention, active mixing devices such as semiconductor laser amplifiers could also be used. In the many applications in which circuit size is an important limitation, the present invention may be readily implemented in the form of a photonic integrated circuit by using active mixing devices in place of dispersion-shifted or nondispersive fiber.

As yet another feature of the present invention, the phase distortion effects resulting from phase modulation used to raise the SBS threshold are eliminated by using the same modulation, but opposite in sign, on the two orthogonally polarized pump signals. Phase conjugate mixing products of the input signal and the two phase modulated beams will therefore not have the low frequency distortion which normally accompanies SBS suppression by phase modulation.

The above-discussed features, as well as additional features and advantages of the present invention, will become apparent by reference to the following detailed description and accompanying drawings.

DETAILED DESCRIPTION

The present invention involves a polarization-insensitive optical mixing apparatus and method particularly well-suited for phase conjugation of optical communication signals. Although the following detailed description illustrates the utility of the present invention primarily in terms of optical phase conjugation using four-photon mixing, it should be understood that this is by way of example and not limitation. The present invention also provides advantages in applications such as optical frequency conversion, global channel inversion and all-optical modulation.

Figure 1:
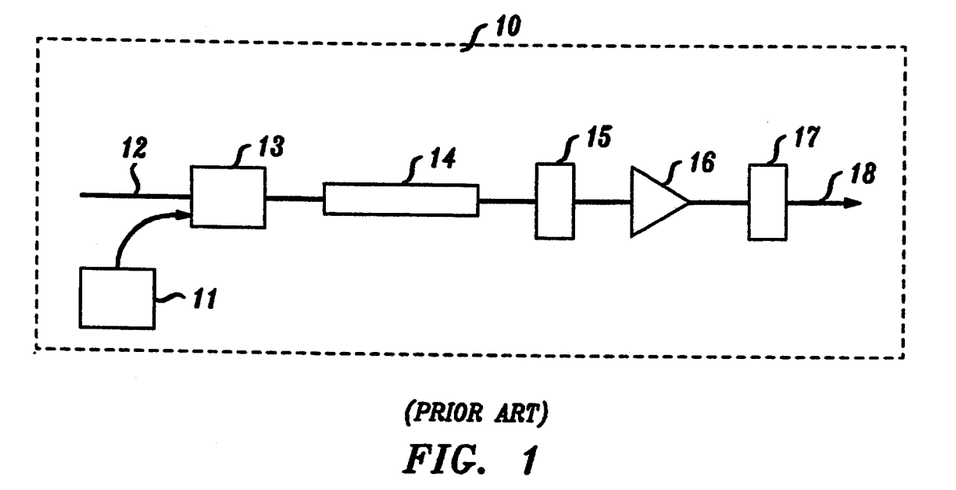
FIG. 1 is an exemplary prior art four-photon mixer using a semiconductor laser amplifier as a mixing device.

As previously mentioned, four-photon mixing is a nonlinear process which produces mixing products by mixing an input optical communication signal with one or more generally higher power pump signals in a nonlinear mixing medium such as a semiconductor laser amplifier or a length of dispersion-shifted fiber (DSF). The various four-photon mixing media will be referred to herein as nonlinear mixing devices. An exemplary prior art four-photon mixer is shown in FIG. 1. The four-photon mixer 10 has a pump source 11 and an optical signal input 12. The pump source 11 produces a pump signal, often simply referred to as a pump, which is combined with an input optical signal from the input 12 in beam combiner 13. While both the input optical signal and the pump signal are optical signals, they will be referred to herein as the optical signal and pump, respectively. The combined optical signal and pump is supplied to a semiconductor laser amplifier 14 which serves as a nonlinear mixing device. A first filter 15 passes the desired mixing product while attenuating the original signal, the pump and any undesired mixing products. The desired mixing product is then amplified in an optical amplifier 16 and finally filtered again in a second filter 17 to remove amplified spontaneous emission (ASE) noise from the desired mixing product output 18. The signal on the output 18 may be a phase conjugate of the signal at input 12 or another desired mixing product.

Figure 2:
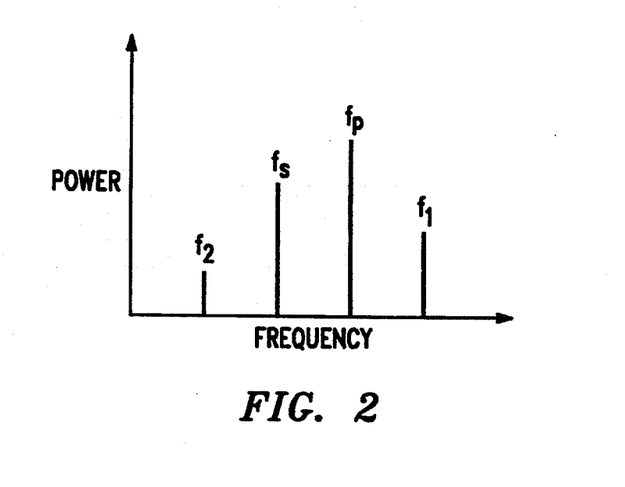
FIG. 2 is an exemplary frequency spectrum showing phase conjugate mixing products resulting from degenerate four-photon mixing of optical communication and pump signals in the device of FIG. 1.

Four-photon mixing in the prior art mixer of FIG. 1 may be degenerate or non-degenerate. In degenerate four-photon mixing, two of the mixing signals are supplied by a single pump. Thus, for an optical signal of frequency fs and a pump at frequency fp, degenerate four-photon mixing produces a phase conjugate of the optical signal at $f1 = 2fp - fs$ and a phase conjugate of the pump at $f2 = 2fs - fp$. The frequency components fs, fp, f1 and f2 associated with degenerate four-photon mixing are illustrated in FIG. 2. When the pump power is greater than the optical signal power, the power level of f1 is greater than the power level of f2. Although this is the typical case, the pump power may also be less than the optical signal power. The component f1 may be used as a phase conjugate of fs in order to compensate for fiber dispersion. Phase matching of the signal and pump may be provided in degenerate mixing by using dispersion-shifted fiber as a mixing medium and a pump frequency which corresponds to the zero dispersion frequency f0 of the dispersion-shifted fiber, as is well known. Proper phase matching ensures that the power of the mixing output products is optimized for a given mixing process. Phase matching refers to the relative phases of the mixing product and the signal components generating the mixing product, which in degenerate four-photon mixing include both of the pumps derived from the single-frequency pump source, as well as the input signal. Any particular mixing product is generated throughout the nonlinear medium and the product so generated propagates through the remaining length of the nonlinear medium. To obtain high efficiency in the generation of a desired mixing product, the four-photon mixing process should be well phase matched for that product. Phase matching of a particular mixing product is used to describe the condition in which, for any point in the nonlinear medium, the optical phase of the generated mixing product matches the optical phase of previously-generated mixing products propagating through that point. When this condition is fulfilled for a particular mixing product, the generated product throughout the nonlinear medium adds in phase to previously-generated products and maximal efficiency is obtained. Thus, while polarization should be aligned between the input signal and the pumps, phase matching of the input and output signals is also desirable to further optimize output signal power.

Figure 3:
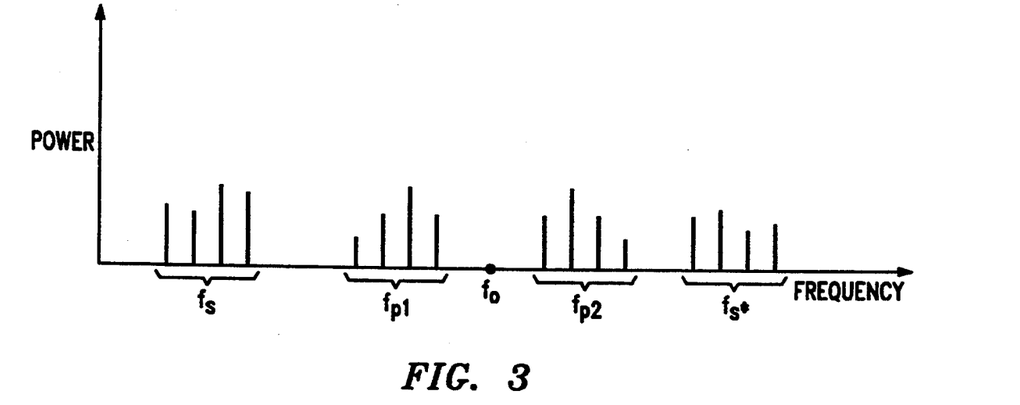
FIG. 3 is an exemplary frequency spectrum illustrating a placement of pump and signal frequencies in accordance with the present invention.

In non-degenerate four-photon mixing, two distinct pumps mix with the incoming optical signal to produce a fourth signal. For an optical signal of frequency fs, a first pump of frequency fp1, and a second pump of frequency fp2, the non-degenerate mixing process produces a phase conjugate of the optical signal at a frequency $fp1 + fp2 - fs$, as well as at the frequencies $2fp1 - fs$ and $2fp2 - fps$. FIG. 3 is an exemplary frequency spectrum illustrating the placement of pump and input signal frequencies for nondegenerate four-photon mixing in accordance with the present invention. In the spectrum of FIG. 3, the input signal and pump spectra are modulated, and appear as groupings of spectral lines, rather than discrete frequencies as in the case of the unmodulated signal and pump shown in FIG. 2. The significance of the modulation will be explained in greater detail below. The point along the frequency axis labelled f0 corresponds to the dispersion zero of the dispersion-shifted fiber used as a mixing medium in this embodiment. When mixing is performed using a device such as a semiconductor laser amplifier, the point f0 may correspond to any point within the operating bandwidth of the device, since chromatic dispersion typically does not play a significant role in phase matching. This is primarily a consequence of the short length of an active nonlinear mixing medium. In the present invention, when used to produce a phase conjugate mixing product in a fiber mixing medium, it is desirable to place the two pump frequencies for non-degenerate mixing symmetrically about the fiber dispersion zero. The two pump signals fp1 and fp2 therefore have frequencies with equal but opposite offsets from the fiber dispersion zero. Symmetric arrangement about the dispersion zero provides optimal phase matching for conjugation of the input signal, leading to higher power in the conjugate output signal. It should be understood that alternative signal and pump frequency arrangements could also be used for non-degenerate four-photon mixing. For example, if frequency shifting of the input signal is desired, then the input signal and one of the pumps should be placed symmetrically about the dispersion zero.

As previously discussed, optimal efficiency in four-photon mixing results when the polarization of the pump or pumps is the same as the polarization of the optical signal being mixed. The equations which illustrate this point are known and will not be reproduced here. The equations are shown in, for example, K Inoue, "Polarization Effect on Four-Wave Mixing Efficiency in a Single-Mode Fiber", Journal of Quantum Electonics, Vol. 28, pp. 883–894, 1992. Polarization-insensitive four-photon mixing permits efficient generation of mixing products without detecting, controlling or otherwise adjusting the input signal polarization. The present invention provides polarization insensitivity by using two orthogonally polarized pump signals centered about the dispersion zero of a nonlinear mixing device such as dispersion-shifted fiber.

Figure 4:
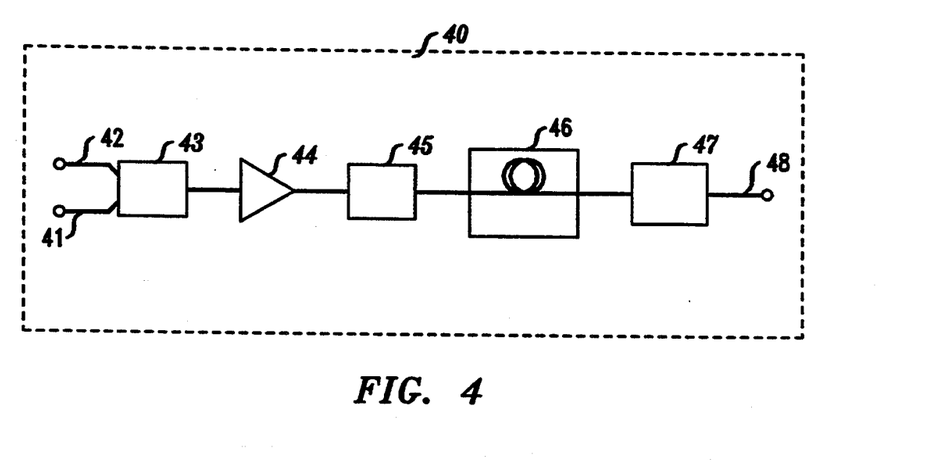
FIG. 4 is a schematic diagram of a polarization-insensitive optical four-photon mixer in accordance with the present invention.

FIG. 4 shows one embodiment of an exemplary polarization-insensitive optical four-photon mixer 40 according to the present invention. The optical four-photon mixer 40 includes an optical signal input 41 and an orthogonal pump input 42. A single channel or multi-channel optical communication signal is applied to the optical signal input 41. Two orthogonally polarized pump signals fp1 and fp2 are applied to pump input 42. Variation from perfect orthogonality of about 10° on the Poincaré sphere may be considered substantial orthogonality for purposes of the present invention. Techniques for generating orthogonally polarized pump signals fp1 and fp2 will be discussed below. The optical signal may be characterized as the sum of the two orthogonal states of polarization. The input optical signal and pumps are combined in beam combiner 43 and if necessary amplified in optical amplifier 44. Optical amplifier 44 may be an erbium-doped fiber amplifier, a semiconductor laser amplifier, or another type of optical amplifier. Although an amplifier is not necessary to obtain mixing products, it is often included to increase the optical power in the mixing products. A noise filter 45 may be included, in order to limit amplified spontaneous emission (ASE) noise from the combined and amplified input and pump signals prior to mixing.

The amplified optical signal and pumps are supplied to a mixing device 46 in which non-degenerate four-photon mixing of the components is performed. In the embodiment shown, a length of about 20 km of silica dispersion-shifted fiber is used as a mixing device. One alternative mixing device, as previously mentioned, is a semiconductor laser amplifier. A semiconductor laser amplifier may be used in space-constrained applications for which a photonic integrated circuit implementation is desirable. The mixing process produces mixing products, one or more of which may be used as phase conjugates of the optical input signal. One phase conjugate product fs* of the non-degenerate mixing in mixing device 46 is shown in FIG. 3. The phase conjugate mixing product fs* is the product corresponding to fp1+fp2−fs. A filter 47 follows mixing device 46 in order to pass the desired mixing products, while attenuating the signal, pumps and undesired mixing product frequencies. For example, filter 47 could be a bandpass filter designed to pass fs* and its modulation while rejecting fs, fp1, fp2, undesired third order mixing products and higher order mixing products. The desired product fs* is present at optical mixer output 48.

The polarization insensitivity of the exemplary optical mixer of FIG. 4 results in part from the orthogonality of the two pump signals fp1 and fp2 supplied to the orthogonal pump signal input 42. The polarization insensitivity of the present invention may therefore be obtained by supplying two orthogonally polarized pump signals to the orthogonal pump input 42, regardless of the manner in which the orthogonal pump signals are generated. In order to provide the advantages of phase matching, the two orthogonal pump signals should also be centered about the dispersion zero of the dispersion-shifted fiber. The two pump signals fp1 and fp2 may be supplied from a single pump source, as long as the signals are orthogonal to each other, and have the desired frequencies.

An optical signal applied to optical signal input 41 is generally an optical communication signal which is to be frequency converted or phase conjugated as required for a given application. It should be noted that the optical signal of the present invention may be either a single channel signal or a multi-channel signal. The embodiment of FIG. 4 will directly perform polarization-insensitive optical four-photon mixing of multi-channel optical signals without the need for channel routers to separate the multi-channel optical signal into its various channel signals prior to mixing. Frequency conversions may therefore be performed in a multi-channel system using a single optical mixer in accordance with the present invention.

The power in the desired mixing product is proportional to the product of the powers of the input optical signal and the two pumps. In the embodiment of FIG. 4, each pump signal has a power level of about 0.0 to +10.0 Dbm, where Dbm refers to decibels relative to 1 mW, such that 1 mW corresponds to 0.0 dBm. Although the mixer output power may be increased by raising the pump signal power, stimulated Brillouin scattering (SBS) determines the maximum pump power that may be used in practice. SBS arises from backward scattering of pump light from phonons in the fiber media, and limits the power in the pump signal that will propagate in the nonlinear medium to a power level known as the SBS threshold. Any pump power in excess of the SBS threshold is scattered back to the input of the fiber and does not contribute fully to the four-photon mixing. SBS distortion usually becomes a significant factor for pump powers in the range of 3.0 to 10.0 Dbm. As is well known, the SBS threshold is raised when the linewidth of the pump signal is wider than the SBS bandwidth of about 20 Mhz. This may be accomplished by using a source with a natural linewidth greater than 20 Mhz, or the linewidth of the pump signal may be widened artificially beyond the SBS bandwidth by phase modulating the pump signal at a rate greater than the reciprocal of twice the light-travel time down the nonlinear medium, for example, 5 Khz for a 20 km long nonlinear medium. A modulation that increases the linewidth to about 200 to 300 Mhz may be used to raise the SBS threshold by about 10 dB such that pump signals having power levels of about 13.0 to 20.0 dBm may be used without significant SBS distortion. The term "phase modulation" also includes frequency modulation since any frequency modulation function can be expressed as an equivalent phase modulation function.

Phase modulation used to overcome the effects of SBS introduces other problems into an optical communication system, since this phase modulation will be impressed on the mixing products. Using a phase modulated pump signal in a four-photon mixing process produces mixing products which have a linewidth of about four times the linewidth of the pump beam when degenerate pumps are used since in this case the phase fluctuations on the pump signal are adding coherently. Increased linewidth may significantly degrade system performance in that chromatic dispersion of optical fiber translates signal frequency variation at, for example, the system midpoint, to phase variation at the receiver. Although this phase variation in the clock-arrival time may be slow with respect to the system data rates, performance may be degraded because the receiver clock-recovery circuit may not be able to track it. In the case of midspan phase conjugation, the increased linewidth of the phase conjugate signal is further dispersed by the fiber in the second half of the span, translating to variation in clock phase at the receiver. The variation in clock phase may be characterized as phase noise or jitter, and may offset the dispersion compensation benefits of the midspan phase conjugation.

The present invention addresses the problems of raising the SBS threshold by using phase modulation signals, which are equivalent but opposite in sign, to phase modulate each of the orthogonally polarized pump signals. The phase modulation of one pump signal is thus opposite in sign to that of the other pump signal. In the case of single frequency modulation, the two modulation signals may be viewed as identical except for a relative phase shift of about 180° between the two signals. A single modulation signal source may be used to supply both pump modulation signals, with the modulation of one of the signals inverted relative to the modulation of the other signal. Optical signals may be described as a CW carrier with phase modulation given by $\phi(t)$, where t is time. The phase of the conjugate signal is $\phi_{product} = \phi_{p1} + \phi_{p2} - \phi_{signal} - kz + \omega t$ where $\phi_{p1}$, $\phi_{p2}$, and $\phi_{signal}$ are the phases of the pump signals and the input optical signal respectively, k and $\omega$ are the wavevector and angular frequency of the conjugate product and z is the distance down the fiber. If $\phi_{p1} = -\phi_{p2}$, then the phases of the pump signals cancel and the modulation linewidth of the pump signals is not impressed on the conjugate product. In effect, although the linewidth of each pump signal would increase, thus raising the SBS threshold, the linewidth of the desired mixing product will not be increased. The increase which would ordinarily result from modulating each pump will be offset by the equivalent phase-shifted modulation on the other pump.

In the previous discussion SBS suppression was described for the case of a mixing product that is a phase-conjugate of the input signal. For some applications, such as frequency shifting signals with single-sideband modulation, it is desirable to suppress SBS for a mixing product that is a phase-analogue rather than a phase-conjugate of the input signal. In this case, to avoid imposing the pump modulations on the mixing product, fp1 and fp2 should have the same modulation rather than opposite modulations. The phase of one of the phase-analogue mixing products is $\phi_{product} = \phi_{p1} - \phi_{p2} + \phi_{signal} - kz + \omega t$ where $\phi_{p1}$, $\phi_{p2}$, $\phi_{signal}$, z, and t have the same definitions as above while k and $\omega$ are the wavevector and angular frequency of the phase-analogue product. If $\phi_{p1} = \phi_{p2}$ then the phases of the pump signals cancel and the modulation linewidth of the pump signals is not impressed on the conjugate product.

Figure 5:
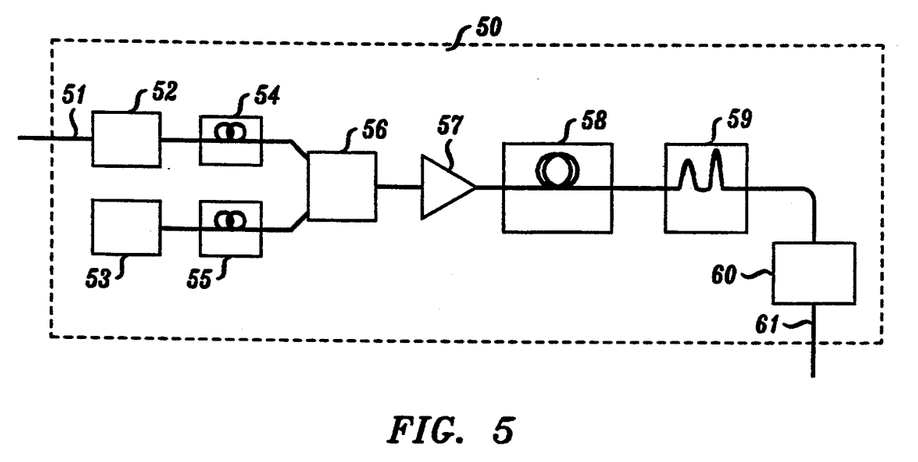
FIG. 5 is a schematic diagram of a system for producing dual orthogonally polarized pump signals in accordance with the present invention.

FIG. 5 is a schematic diagram of an exemplary system 50 for producing two orthogonally polarized pump signals in accordance with the present invention. The exemplary orthogonal pump generator 50 uses degenerate four-photon mixing in a nonlinear mixing device. The orthogonal pump generator 50 includes a phase modulation input 51 for supplying a phase modulation signal at a frequency of about 0.05 to 1000 Mhz to a signal source 52 of frequency f1. The phase modulation is used to raise the SBS threshold of the pump signals, as described above. The signal source 52 supplies an optical signal of frequency f1 having a power level of about 0.0 dBm. The optical signal of frequency f1 serves as a first pump signal. A second signal source 53 supplies a mixing signal of frequency fp having a power level of about 0.0 dBm. Either or both of the signal sources 52, 53 may be followed by a polarization controller 54, 55 in order to adjust the polarization of the respective source output signals. The first pump signal f1 and the mixing signal fp from sources 52, 53, respectively, are fed into a beam combiner 56 where the signals are combined. The combined first pump signal and mixing signal are amplified in amplifier 57 and then supplied to a nonlinear mixing device 58, where first pump signal f1 mixes with mixing signal fp. The four-photon mixing process in mixing device 58 produces a number of mixing products, one of which is a conjugate f2 of the modulated first pump signal f1, where f2=2fp−f1. The conjugate signal having frequency f2 is the second pump signal produced in the orthogonal pump signal generator 50. The modulated first and second pump signals f1 and f2 are passed through a filter 59 which passes the second pump signal f2, attenuates the first pump signal at frequency f1 to the approximate level of the second pump signal f2, and blocks mixing signal at frequency fp. Finally, the first and second pump signals at frequencies f1 and f2 are supplied to a polarization orthogonalizer 60 which adjusts the relative polarization of the two pump signals to provide orthogonal polarization. The first and second pump signals at frequencies f1 and f2 at output 61 represent orthogonal pump signals which may be input into orthogonal pump signal input 42 of the polarization-insensitive optical mixer of FIG. 4.

Furthermore, the orthogonally polarized first and second pump signals of frequencies f1 and f2 have equivalent but opposite modulation since they are conjugates of each other. The orthogonal pump signals at output 61 have a higher SBS threshold as a result of the phase modulation, but there will be no phase distortion introduced into the mixing products of subsequent four-photon mixing products because the phase modulation effects of both pumps offset each other. The phase modulation on the pumps will therefore not appear on certain output mixing products of the two pump frequencies, such as the phase conjugate mixing product.

The polarization orthogonalizer 60 may be used when the polarization controllers 53, 54 are not sufficient to set the desired polarization between the two generated pump signals of frequencies f1 and f2. This will be the case when, for example, the choice of nonlinear medium 58 does not allow the generation of a conjugate mixing product f2 with a polarization orthogonal to that of f1. The polarization orthogonalizer 60 can take as inputs, for example, the signals f1 and f2 having an equivalent polarization, and output signals f1 and f2 with orthogonal polarizations. One possible implementation of the polarization orthogonalizer 60 is a length of highly-birefringent fiber with pump signals f1 and f2 entering with a linear polarization oriented at 45° to the fiber axis. The length of the birefringent fiber should be chosen such that 180° of phase shift are provided between the signals of frequencies f1 and f2. Another possible implementation uses narrowband polarizing beam splitters, one pair of beam splitters for each of the pump signals f1 and f2. The signals f1 and f2 are passed through their respective beam splitters and recombined such that the signals f1 and f2 are thereby made orthogonal. Another possibility is to generate signal f2 such that it will be orthogonal to signal f1 without the need for a polarization orthogonalizer by, for example, adjusting one or more of the polarization controllers 54, 55.

As described previously, to suppress SBS when frequency-shifting an input signal without phase-conjugation, it is necessary to provide the same modulation to the two pump signals. The methods described previously for generating pump signals f1 and f2 that are phase-conjugate to each other can be simply adapted to generate a pump signal f2 that is a phase analogue to f1. If the mixing signal fp is replaced by two mixing signals, fpa and fpb, then mixing products will be generated that are phase-analogue to f1 at frequencies f1+fpa−fpb and f1+fpb−fpa. Either of these signals can be used as the second pump signal f2. Since f1 and f2 are then phase-analogues, the modulation on these pumps will not introduce phase distortion into certain subsequent four-photon mixing products. These products, at frequencies of fs+f1−f2 and fs+f2−f1, are frequency-shifted phase-analogues of the input signal at frequency fs.

An alternative embodiment for the exemplary system of FIG. 5 could include a beam splitter (not shown) between polarization controller 54 and beam combiner 56. The first pump signal is split in the beam splitter, passed through a delay element (not shown), and input into polarization orthogonalizer 60. Filter 59 could then be designed to pass only the second pump signal being supplied to orthogonalizer 60 via the beam splitter and delay element. The delay element should provide a delay for the first pump signal which is approximately the same as the delay experienced by the second pump signal in reaching orthogonalizer 60.

Figure 6:
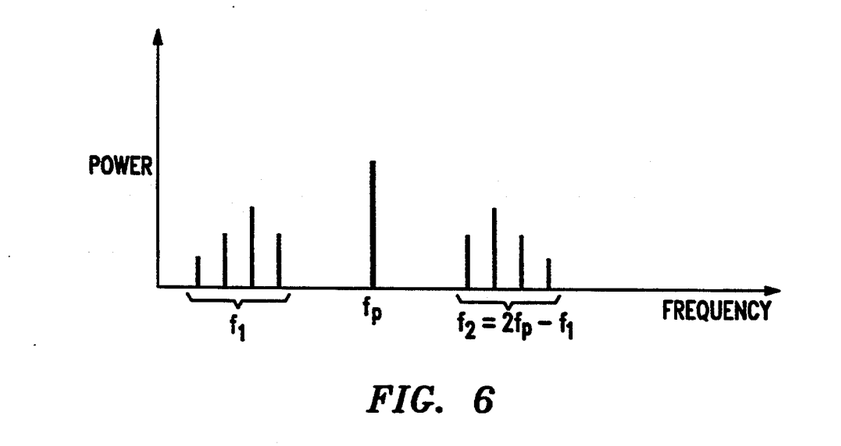
FIG. 6 is an exemplary frequency spectrum illustrating a set of input signals suitable for use with the embodiment shown in FIG. 5.

FIG. 6 is an exemplary frequency spectrum illustrating the first and second pump signals and the mixing signals within the orthogonal pump signal generator of FIG. 5. The group of signal components labeled f1 represents a phase modulated first pump signal. The single signal component at frequency fp represents an unmodulated mixing signal. It should be noted that the mixing signal of frequency fp actually serves as a pump signal in FIG. 5, which represents a degenerate four-photon mixing of signals of frequencies f1 and fp. Since the signals of frequencies f1 and f2 both serve as pump signals in subsequent four-photon mixers, such as that shown in FIG. 4, the term "mixing signal" is used to describe the signal of frequency fp in FIGS. 5 and 6 in order to avoid confusion. The frequency fp of the mixing signal may be chosen to coincide with the dispersion zero of the mixing device used in subsequent optical mixing. For example, if dispersion-shifted fiber is used as a mixing device in the subsequent mixing process, the two orthogonal pumps should have frequencies symmetrically offset from the fiber dispersion zero. In order to generate such a frequency arrangement, the mixing signal fp shown in FIG. 6 should coincide with the fiber dispersion zero. The first pump signal at frequency f1 should be placed a desired distance away from fp. The result after degenerate four-photon mixing in the generator of FIG. 5 will be two orthogonally polarized pump signals of frequencies f1 and f2 arranged symmetrically about the fiber dispersion zero. Although the generator of FIG. 5 uses degenerate four-photon mixing to produce orthogonal pumps, other mixing processes could be used, including non-degenerate four-photon mixing. Furthermore, although an important application of the above orthogonal pump generator is polarization-insensitive optical mixing, the generator could also be used in other applications which require high power orthogonal signals, such as polarization-multiplexed optical communication and, with the deletion of polarization orthogonalizer 60, the generator could be used in applications requiring conjugate beams with non-orthogonal polarizations, such as for SBS suppression in polarization-dependent four-photon mixing.

In order to optimize the performance of the present invention, the polarization of the two pump signals should be substantially orthogonal. The foregoing description assumes that the performance of the optical mixer and the components thereof will not change or degrade as a function of time. Therefore, pump polarizations may be set once and further adjustment will not be necessary. However, in practical systems, there is a possibility that pump polarization will deviate from orthogonal over time and that adjustments in various parameters may therefore be necessary. To decrease the sensitivity of the optical mixer to deviations from pump signal orthogonality, polarization-maintaining fiber may be used. Since for some embodiments circularly-polarized pumps may have a significantly higher conversion efficiency than linearly-polarized pumps, polarization maintaining fiber with high circular birefringence is preferred for these embodiments, but linearly-polarized polarization-maintaining fiber could also be used. In either case, adjustment to the fiber dispersion could be made to ensure phase matching. Adjustment in dispersion is typically required to phase match when using polarization maintaining fiber because in general the fiber will not be phase matched for the desired pump and signal frequencies. When normal-birefringence optical fiber is used as a mixing medium, the relative polarization of the pump signals must be carefully controlled in order to provide proper system performance, since relatively small deviations from pump orthogonality, on the order of 10° on the Poincaré sphere, may result in substantial degradation in mixing product power.

Figure 7:
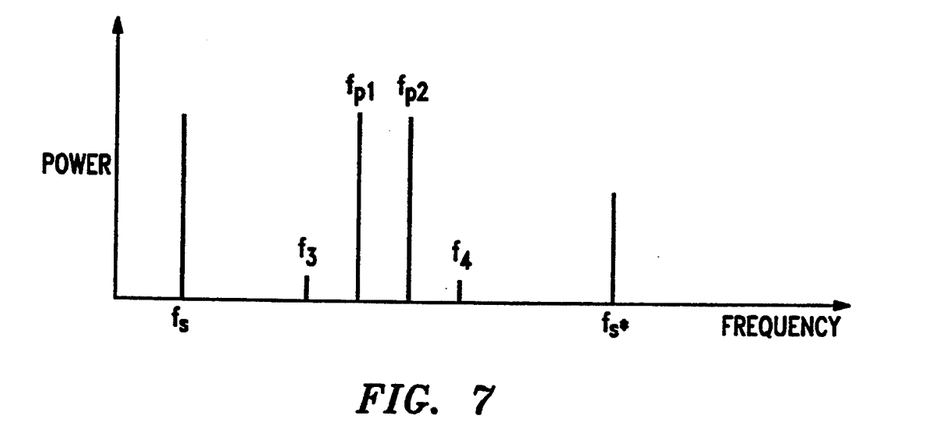
FIG. 7 is an exemplary frequency spectrum illustrating an exemplary placement of signal and pump frequencies, along with two-tone products to be minimized in accordance with the present invention.

An alternative to polarization maintaining fiber as a mixing medium is pump polarization control. It has been verified experimentally that optimal pump polarization may be maintained by minimizing the power levels of certain mixing products. FIG. 7 is an exemplary frequency spectrum illustrating an exemplary placement of signal and pump frequencies in accordance with the present invention. Certain mixing products f3 and f4 are also shown. The mixing products f3 and f4 are known as two-tone mixing products because they represent products of the two pump signals or tones. For example, the two-tone products f3 and f4 shown in FIG. 7 are given by f3=2fp1−fp2 and f4=2fp2−fp1. A variety of other two-tone products, which are not shown in FIG. 7, are also produced in the four-wave mixing process. Experimentation has shown that the power of the two-tone products such as f3 and f4 is a function of relative pump signal polarization. When the power at frequencies f3 and f4 is minimized, the sensitivity of the mixing product at frequency fp1+fp2−fs=fs, to the polarization of input signal fs is minimized. The present invention exploits this experimental result to provide improved mixer performance over time. Adjustments in the relative polarization of the pump signals may be made based upon measurements of two-tone signal power. Although two-tone mixing products are used to illustrate this aspect of the invention, it should be understood that other mixing products may provide similar information regarding pump polarization, and could therefore also be used. These other mixing products include 2fp2−fs and 2fp1−fs. Furthermore, other techniques for establishing or maintaining proper pump signal polarizations may be used, including injecting the pump signals through a polarizing beam splitter, or using a polarization analyzer to measure the pump polarizations.

Figure 8:
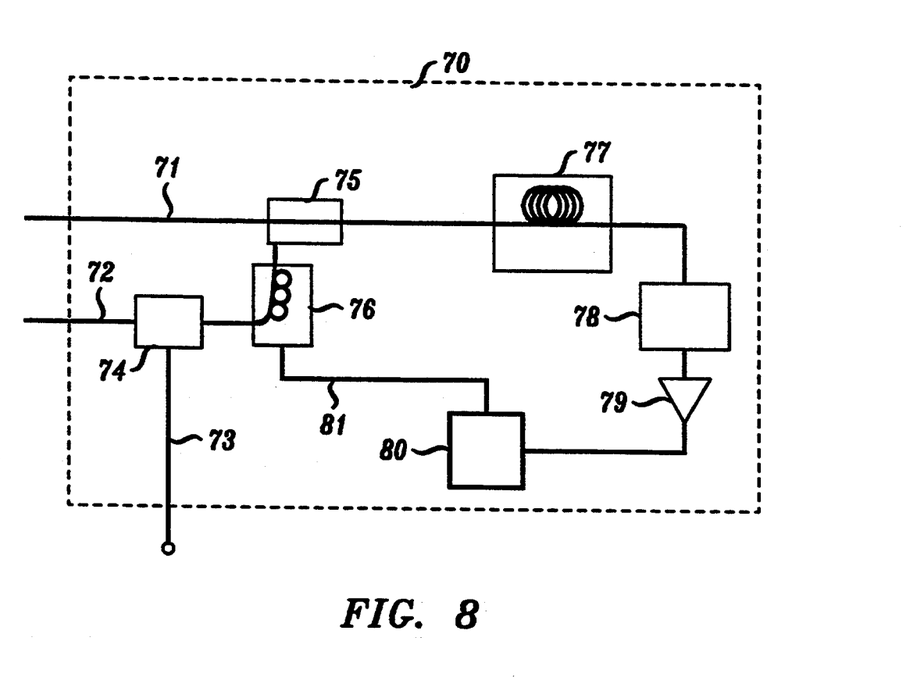
FIG. 8 is an embodiment of an automatic polarization controller suitable for use in minimizing two-tone mixing products in accordance with the present invention.

FIG. 8 is an embodiment of an optical mixer incorporating automatic polarization adjustment suitable for use in establishing or maintaining optimal pump orthogonality by minimizing two-tone mixing products. The optical mixer 70 includes a signal input 71 which receives a single or multi-channel optical signal to be mixed to another frequency. Two orthogonally polarized pump signals are input via pump inputs 72, 73. The pump signals are supplied to a polarizing beam splitter 74 in order to combine the pump signals according to polarization. The output of polarization beam splitter 74 is supplied to an automatic polarization controller 76. Orthogonal pump inputs 72, 73 are orthogonally polarized through beam splitter 74 and a desired polarization may be maintained via polarization controller 76 while maintaining the orthogonality of the two pumps. The polarization controller 76 supplies orthogonally polarized versions of the two pump signals applied to inputs 72, 73 to a beam combiner 75 which combines the pumps with the input optical signal. The combined signals are supplied to a nonlinear mixing device 77 which may be a length of dispersion-shifted optical fiber. A feedback filter 78 selects a desired mixing product for application to automatic polarization controller 76. The filter 78 may therefore be designed to pass one or both of the frequency components f3 and f4 corresponding to the two-tone products discussed above. A detector 79 is used to transform the power level of the selected two-tone product to a voltage suitable for driving a feedback circuit 80. Feedback circuit 80 includes additional circuitry for processing electrical signals representing two-tone power level such that the resulting processed signals may drive polarization controller 76. Polarization controller 76 has the capability of adjusting pump signal polarization while maintaining orthogonality of the two pumps until a signal on line 81 out of feedback circuit 80 is reduced to zero or minimized. Thus, the optical mixer 70 will have a reduced sensitivity to variation in input signal polarization by adjusting pump polarization to minimize two-tone products. The mixer of FIG. 8 could also include a beam splitter (not shown) which would allow a portion of the output mixing products to pass to the mixer output, and a portion of the same products to pass into the feedback filter 78.

The automatic polarization controller 76 is a device which will make adjustments in pump signal polarization as required to minimize a feedback signal applied to its input. Exemplary automatic polarization controllers are described in U.S. Pat. Nos. 4,966,431 and 5,212,743, issued to F. Heissman. The optical mixer 70 is shown in simplified form to emphasize the feedback control circuitry of this aspect of the invention. The optical mixer 70 could therefore include additional amplification and filtering as shown in the embodiment of FIG. 4.

Figure 9:
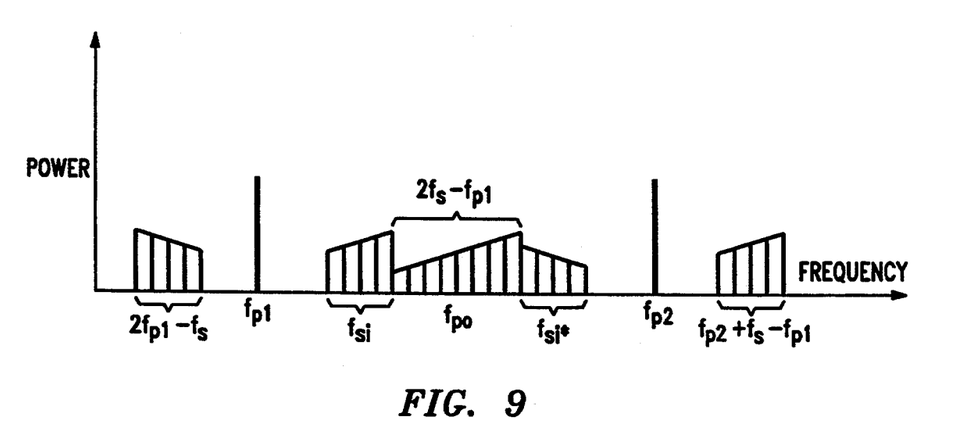
FIG. 9 is an exemplary frequency spectrum illustrating a placement of optical signal and pump frequencies such that the signal frequencies are located between the two pump frequencies.

The signals and pumps used in accordance with the present invention may be placed at a variety of locations subject to certain practical limitations. One important limitation results from undesired mixing products overlapping or otherwise interfering with the desired product. For example, nondegenerate four-photon mixing of the signals fs, fp1 and fp2 in FIG. 3 will produce a phase conjugate fs, at fp1+fp2−fs. However, undesired mixing products are generated at frequencies of 2fp1−fs, 2fp2−fs, and 2fp2−fp1. These undesired products can interfere with the desired product, particularly when the input signal fs occupies a band of frequencies. A multi-channel input signal, for example, may include several wavelength division multiplexed channel signals such that the input signal occupies a band of frequencies fsi as shown in FIG. 9. The interference with the desired mixing signal may be minimized by proper relative placement of the pump and input signals in accordance with the design rules described below.

Although the embodiments previously discussed generally used an input signal frequency outside the pump signal frequencies, the input signal frequency may also be within the pump signal frequencies. Placing the input signal within the pump signal frequencies will produce a phase conjugate signal also within the pump signal frequencies. The exemplary frequency spectrum of FIG. 9 illustrates a placement of optical signal and pump frequencies such that the signal frequencies are located between the two pump frequencies. In accordance with the present invention, interference between the desired phase conjugate mixing product and other undesired mixing products is minimized by such a signal and pump placement. Referring to FIG. 9, a multi-channel input signal occupies a band of frequencies fsi. Four-photon mixing produces a phase conjugate mixing product occupying a band of frequencies fsi*. An undesired mixing product occupies a band of frequencies given by 2fs−fp1 as shown. The undesired component 2fs−fp1 occupies a band centered about the dispersion zero fp0 and for the spacing shown occupies the entire band between fsi and fsi*. Additional unwanted mixing products at frequencies fp2+fs−fp1 are located as shown outside the pump signal frequencies while frequency 2fp2−fs lies outside the plotted range. Interference with the desired product fsi* is minimized in the arrangement of FIG. 9 since the unwanted products 2fp1−fs, 2fp2−fs and 2fp2−fp1 fall outside the pump frequencies away from fsi and fsi*. The only undesired mixing product that lies near the band occupied by fsi or fsi* is the product 2fs−fp1. If a dispersion-shifted fiber is used as a nonlinear mixing medium, spacing fsi and fsi* apart from the fiber dispersion zero as shown in FIG. 9 will result minimal interference since the undesired mixing product will be poorly phase matched, resulting in lower power at that product. The pump frequencies fp1 and fp2 generally may be placed within a wide variety of locations outside of fsi and fsi*.

If the maximum and minimum frequencies in the band fsi are given by fsmax and fsmin, respectively, then to minimize interference, the following design rules regarding frequency placement should be followed. In order to prevent overlap of fp2 with the conjugate fsi*, fp1 should be less than fsmin. The frequency band fsi, given by fsmax-fsmin, should be less than twice fpo-fsmax to prevent two-tone products similar to 2fsmax−fsmin from overlapping fsi*. To prevent the mixing product 2fsi−fp1 from overlapping the conjugate fsi*, fsmax should be less than one-third of 2fp0+fp1. Finally, to prevent 2fsi−fp1 from overlapping the signal fsi, the frequency span fsmax−fsmin should be less than fsmin−fp1. These limitations apply regardless of the mixing device used if interference is to be completely avoided. However, if a DSF is used as the mixing device, then the interfering signals will generally not be well phase matched and the limitations can be relaxed.

Figure 10A:
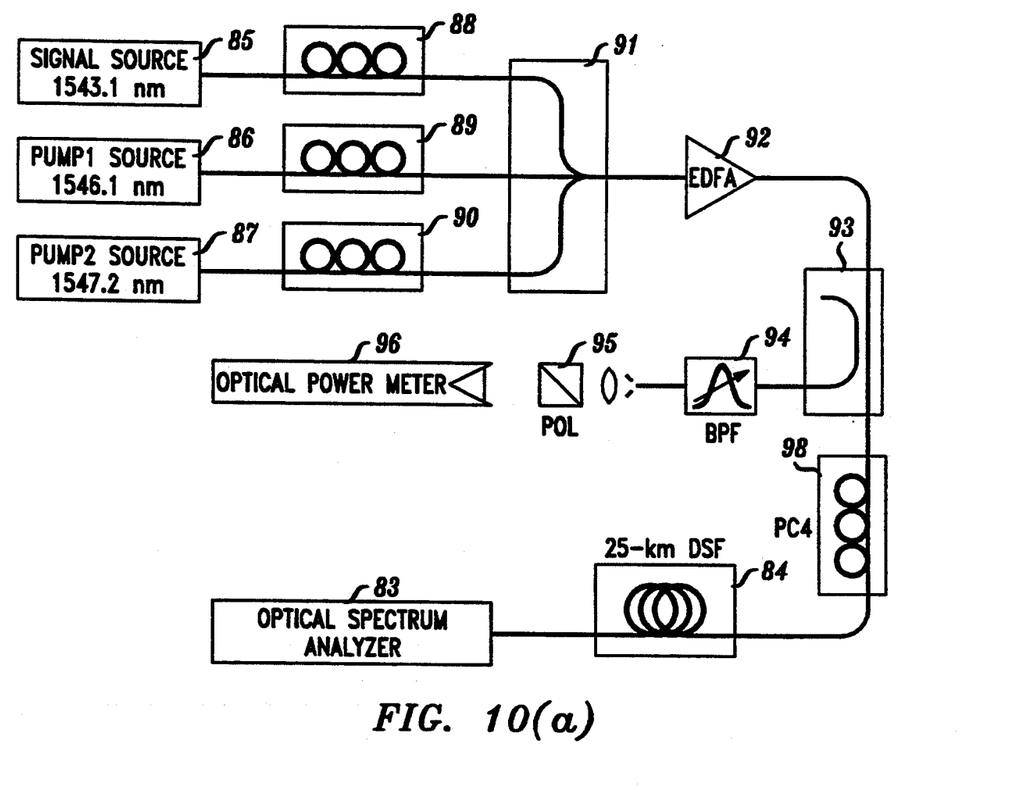
FIG. 10(a) is an exemplary experimental set-up used to verify the polarization insensitivity of the embodiment shown in FIG. 4.

FIG. 10(a) is an exemplary test setup used to verify the polarization insensitivity of an embodiment of the present invention. The test setup includes an optical spectrum analyzer 83 for displaying optical frequency spectra resulting from nondegenerate four-photon mixing in 25 km dispersion-shifted fiber 84. An optical signal source 85 provides a single channel optical signal at a variable wavelength. A first pump source 86 outputs a first pump signal at a wavelength 1546.1 nm, and a second pump source 87 outputs a second pump signal at a wavelength of 1547.2 nm. Polarization controllers 88, 89, and 90 are provided at each of the signal and pump source outputs. The pump sources 86, 87 could therefore be adjusted to have orthogonal polarizations. In addition, via polarization controller 88, the polarization of the input signal from signal source 85 could be adjusted to provide a full range of possible input signal polarizations in order to verify polarization insensitivity. The input and pump signals are combined in optical beam combiner 91 and the combined signals are then amplified in erbium-doped fiber amplifier 92. A coupler 93 couples a portion of the combined signal power off to a variable band pass filter 94, polarizer 95 and optical power meter 96, in order to measure power level within the various mixer input signals. A fourth polarization controller 98 is included in the combined signal and pump path in order to provide further polarization adjustment capability in the test setup. This setup was used to measure polarization insensitivity in an optical mixer using non-degenerate four-photon mixing with two orthogonally polarized pump signals. The polarization controller 88 was varied for a given arrangement of signal and pump frequencies, with the first and second pump signals orthogonally polarized, in order to measure the variation in the output power of a desired mixing product. In these tests, the desired mixing product used was the phase conjugate of the input signal. In order to demonstrate polarization-independent four-photon mixing in a semiconductor laser amplifier, the DSF was replaced by an approximately-polarization-independent semiconductor laser amplifier.

Figure 10B:
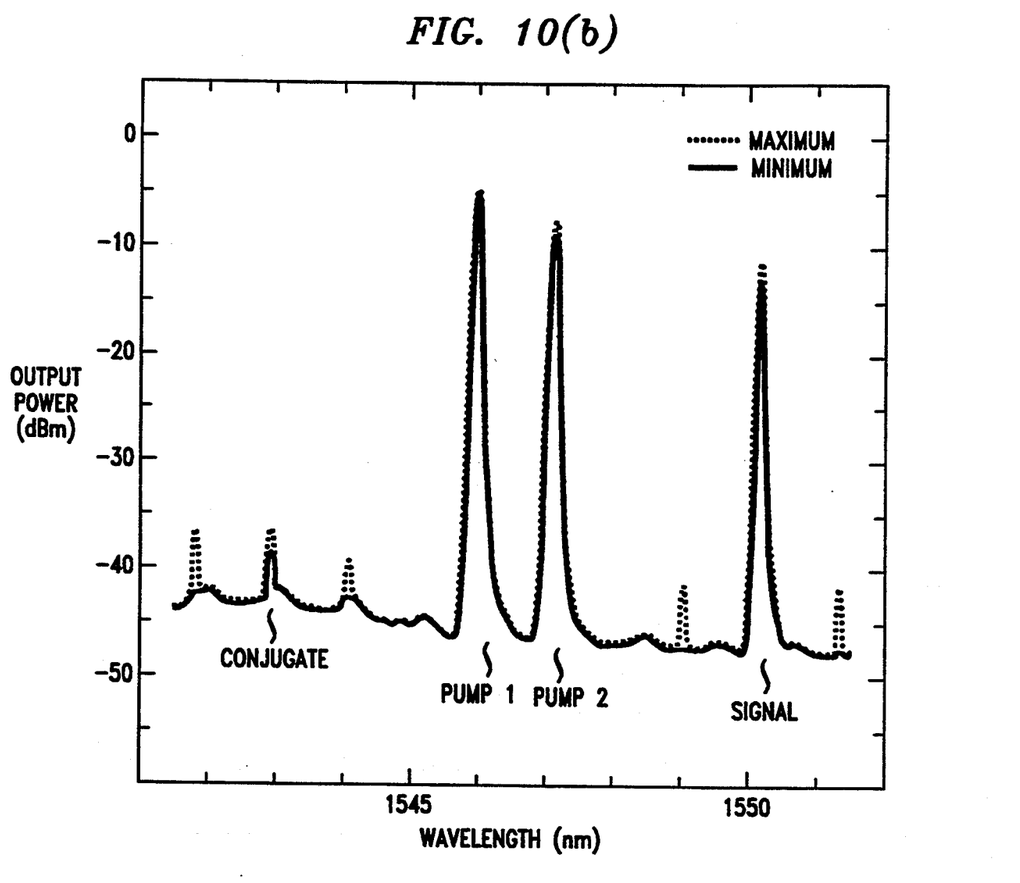
FIG. 10(b) is a plot of a frequency spectrum obtained using the equipment of FIG. 10(a) with 25 km of dispersion-shifted fiber as a mixing medium and the optical signal frequency lower than the pump signal frequencies.

FIG. 10(b) is a plot of a frequency spectrum obtained using the test setup of FIG. 10(a) with the optical signal frequency higher than the pump signal frequencies. The optical input signal had a wavelength of about 1550.3 nm, producing a conjugate at about 1543.1 nm. In this case, the optical signal frequency was lower than the two pump frequencies, and the conjugate was produced at a frequency above that of the two pumps. The nonlinear mixing medium was a semiconductor laser amplifier. The resulting conjugate exhibited a variation in power level of only about 2.0 dB for all possible input polarization states. The highest signal power for the conjugate across polarizations is shown by the dotted line, while the lowest is shown by the solid line. By comparison, if pumps without orthogonal polarization were used, the conjugate signal would be reduced to zero for certain input polarizations. With the orthogonal pumps of the present invention, the variation is only about 2 dB across all polarizations.

Figure 10C:
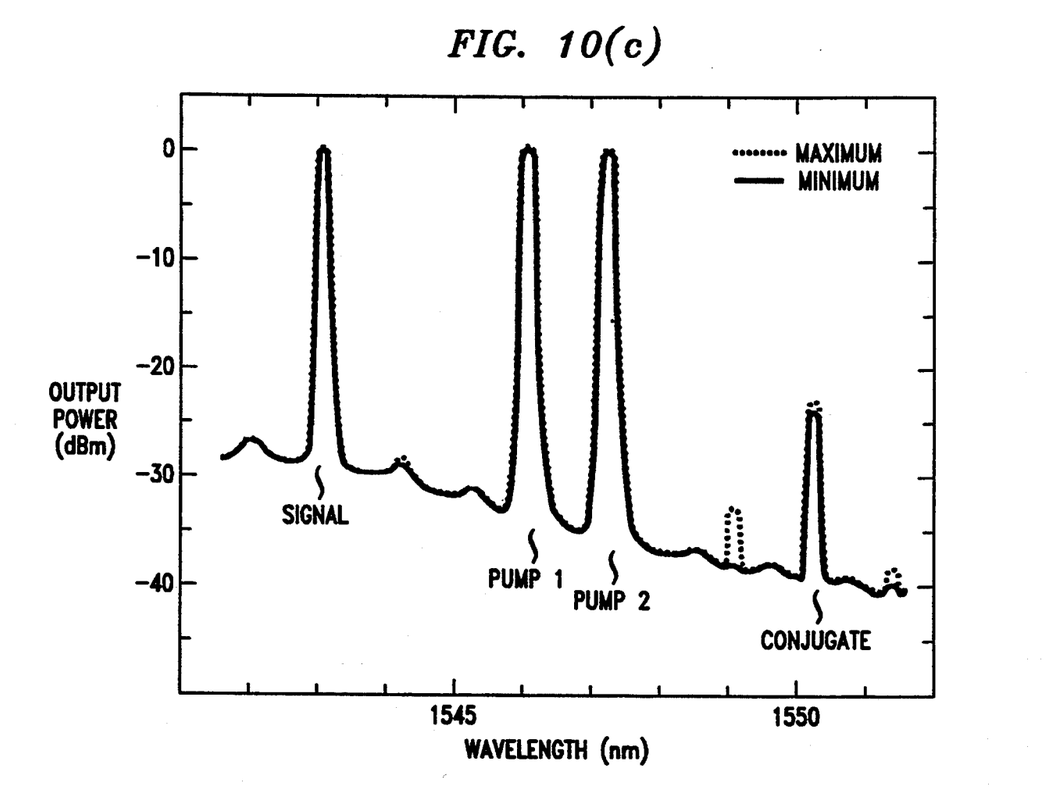
FIG. 10(c) is a plot of a frequency spectrum obtained using the equipment of FIG. 10(a) with a semiconductor laser amplifier as a mixing medium and the optical signal frequency higher than the pump signal frequencies.

FIG. 10(c) is a plot of a frequency spectrum obtained using the test setup of FIG. 10(a) with the optical signal frequency higher than the pump signal frequencies. An optical input signal having a wavelength of about 1543.1 nm was used to produce a conjugate at a wavelength of about 1550.3 nm. The nonlinear mixing medium used in this case was 25 km of dispersion-shifted fiber. Again, the dotted lines in the plot indicate maximum conjugate signal power across all possible states of input signal polarization, while the solid lines indicate the minimum. A variation of only about 1.0 dB is obtained across all input polarizations using dispersion-shifted fiber as a mixing medium. The use of orthogonal pump signals in accordance with the present invention therefore provides substantial polarization insensitivity in optical mixing regardless of the type of mixing medium used.

While the foregoing detailed description was primarily directed to polarization-insensitive optical four-photon mixing, it should again be emphasized that the embodiments and applications discussed are exemplary only. For example, the optical mixer of the present invention is not limited to communications applications, but instead is suitable for use in any application requiring optimal mixing of an optical signal. Other potential applications include optical data processing and optical sensing. Certain hardware parameters, including but not limited to configuration of the pump source or sources, relative arrangement of signal and pump frequencies, use of degenerate or non-degenerate mixing, type of mixing device, and method of generating orthogonal pumps, may be altered to suit the needs of a given application. These and other alternatives and variations in the arrangements shown will be readily apparent to those skilled in the art.

We claim:

1. A method of polarization-insensitive optical mixing comprising the steps of:
   providing an input optical signal;
   providing two substantially orthogonally-polarized pump signals;
   four-photon mixing said input optical signal and said two substantially orthogonally-polarized pump signals in a first nonlinear mixing device to produce a mixing product related to said input optical signal and having a power level substantially insensitive to variations in polarization of said input optical signal.

2. The method of claim 1 wherein said step of providing two substantially orthogonally-polarized pump signals further includes the steps of:
   providing a first signal source for supplying a first pump signal;
   providing a second signal source for supplying a mixing signal;
   four-photon mixing said first pump signal and said mixing signal in a second nonlinear mixing device to produce a second pump signal.

3. The method of claim 2 wherein said step of providing a first signal source for supplying a first pump signal includes providing a phase modulated first signal source for supplying a phase modulated first pump signal.

4. The method of claim 3 wherein said step of four-photon mixing said phase modulated first pump signal with said mixing signal produces a phase modulated second pump signal having phase modulation substantially opposite in sign to phase modulation of said phase modulated first pump signal, such that subsequent four-photon mixing steps utilizing said first and said second pump signals will allow effects of said phase modulation to cancel in mixing products conjugate to said input optical signal.

5. The method of claim 2 further including the step of amplifying said first pump signal and said mixing signal prior to said step of four-photon mixing said first pump signal and said mixing signal in said second nonlinear mixing device.

6. The method of claim 2 further including the step of filtering said first and said second pump signals after said step of four-photon mixing said first pump signal and said mixing signal to produce said second pump signal.

7. The method of claim 2 further including the step of providing a polarization orthogonalizer for controlling polarization of said first and second pump signals after said step of four-photon mixing said first pump signal and said mixing signal.

8. The method of claim 2 further including the step of providing a polarization controller at an output of at least one of said first and said second signal sources.

9. The method of claim 1 wherein said step of four-photon mixing said input optical signal and said two substantially orthogonally-polarized pump signals in a nonlinear mixing device to produce a mixing product includes producing a phase conjugate of said input optical signal.

10. The method of claim 9 further including the step of filtering said mixing product of said two substantially orthogonally-polarized pump signals and said input optical signal to attenuate mixing products other than said phase conjugate of said input optical signal.

11. The method of claim 1 further including the step of amplifying said input optical signal and said two substantially orthogonally polarized pump signals prior to said step of four-photon mixing said input optical signal and said two substantially orthogonally polarized pump signals in said nonlinear mixing device.

12. The method of claim 1 wherein said step of providing two substantially orthogonally polarized pump signals includes providing two substantially orthogonally polarized pump signals substantially centered about a dispersion zero of said nonlinear mixing device.

13. The method of claim 1 wherein said step of providing an input optical signal includes providing a multi-channel optical signal.

14. A polarization-insensitive optical mixer comprising:
   a signal input for receiving an input optical signal;
   a pump signal input for receiving two substantially orthogonally-polarized pump signals; and
   a first nonlinear mixing device for four-photon mixing said input optical signal and said two substantially orthogonally-polarized pump signals to produce a mixing product related to said input optical signal and having a power level substantially insensitive to variations in polarization of said input optical signal.

15. The optical mixer of claim 14 wherein said two substantially orthogonally-polarized pump signals are generated in an orthogonal pump signal generator comprising:
   a first signal source supplying a first pump signal;
   a second signal source supplying a mixing signal; and
   a second nonlinear mixing device for four-photon mixing said first pump signal and said mixing signal to produce a second pump signal.

16. The optical mixer of claim 15 wherein said first signal source is phase modulated to produce a phase modulated first pump signal.

17. The optical mixer of claim 16 wherein four-photon mixing said phase modulated first pump signal with said mixing signal produces a phase modulated second pump signal having phase modulation substantially opposite in sign to phase modulation of said phase modulated first pump signal, such that subsequent four-photon mixing utilizing said first and said second pump signals will allow effects of said phase modulation to cancel in mixing products conjugate to said input optical signal.

18. The optical mixer of claim 15 further including a filter connected to an output of said second nonlinear mixing device for filtering said first and said second pump signals.

19. The optical mixer of claim 15 further including a polarization controller connected to an output of said second nonlinear mixing device for controlling polarization of said first and second pump signals.

20. The optical mixer of claim 15 further including a polarization controller at an output of at least one of said first and said second signal sources.

21. The optical mixer of claim 14 wherein said mixing product is a phase conjugate of said input optical signal.

22. The optical mixer of claim 14 wherein said two substantially orthogonally polarized pump signals are substantially centered about a dispersion zero of said first nonlinear mixing device.

23. An optical signal generator for generating pump signals, comprising:
   a first signal source supplying a first pump signal;
   a second signal source supplying a mixing signal; and a nonlinear mixing device for four-photon mixing said first pump signal and said mixing signal to produce a second pump signal which is a phase conjugate of said first pump signal.

24. The optical signal generator of claim 23 wherein said first pump signal from said first signal source is phase modulated by a modulation signal and said four-photon mixing in said nonlinear mixing device produces a phase modulated second pump signal.

25. The optical signal generator of claim 24 wherein said phase modulation on said first pump signal and that on said second pump signal are phase conjugates of each other.

* * * * *